(12) United States Patent
Hermann

(10) Patent No.: US 7,499,781 B2
(45) Date of Patent: Mar. 3, 2009

(54) METHOD AND APPARATUS FOR CONTROLLING A VEHICLE OCCUPANT PROTECTION DEVICE

(75) Inventor: Stefan Hermann, Köfering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/799,751

(22) Filed: Mar. 5, 2001

(65) Prior Publication Data

US 2001/0025215 A1  Sep. 27, 2001

Related U.S. Application Data

(63) Continuation of application No. PCT/DE99/02801, filed on Sep. 3, 1999.

(30) Foreign Application Priority Data

Sep. 4, 1998 (DE) .................. 198 40 440

(51) Int. Cl.
B60R 22/00 (2006.01)

(52) U.S. Cl. .................. 701/45; 701/46; 180/268; 180/271; 280/735

(58) Field of Classification Search .............. 701/45, 701/46; 180/232, 268, 271; 280/728.1, 734, 280/735
See application file for complete search history.

(56) References Cited

U.S. PATENT DOCUMENTS 5,164,901 A   11/1992  Blackburn et al.
5,249,826 A * 10/1993  Bell .............................. 280/734
5,295,709 A *  3/1994  Bell .............................. 280/734
5,518,271 A *  5/1996  Bell .............................. 280/806
5,681,057 A * 10/1997  Whirley et al. ............... 280/784

FOREIGN PATENT DOCUMENTS

| DE | 39 24 507 A1 | 8/1990 |
| DE | 41 12 579 A1 | 10/1991 |
| DE | 42 12 421 A1 | 10/1993 |
| DE | 44 09 711 A1 | 9/1995 |
| DE | 197 10 451 A1 | 4/1998 |
| DE | 197 24 101 A1 | 12/1998 |
| EP | 0 156 930 A1 | 10/1985 |
| EP | 0 567 900 A1 | 4/1993 |

* cited by examiner

*Primary Examiner*—Gertrude Arthur Jeanglaud
(74) *Attorney, Agent, or Firm*—Laurence A. Greenberg; Werner H. Stemer; Ralph E. Locher

(57) ABSTRACT

A method for controlling a vehicle occupant protection device includes the steps of providing a mass of a vehicle as an operand and a dependence between a deformation of the vehicle body and work to be performed for the deformation. The vehicle acceleration is recorded with an acceleration sensor. The vehicle occupant protection device is controlled as a function of the mass of the vehicle, the work, and the acceleration. To control the device, the mass and the dependence are stored in a memory. The actual deformation of the vehicle body that occurs during an accident is determined as a function of acceleration recorded, the work, and the mass of the vehicle. The vehicle occupant protection device is controlled as a function of the actual deformation of the vehicle body or of a variable derived from it. An apparatus for controlling the device includes an acceleration sensor having a memory and an arithmetic unit.

21 Claims, 2 Drawing Sheets

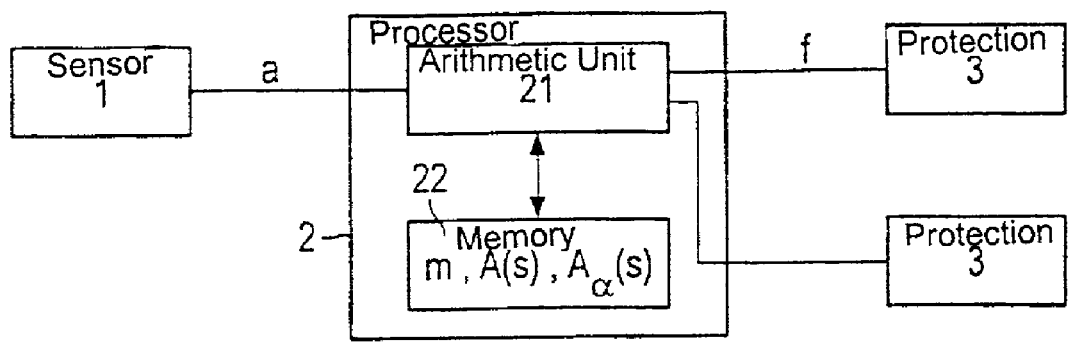
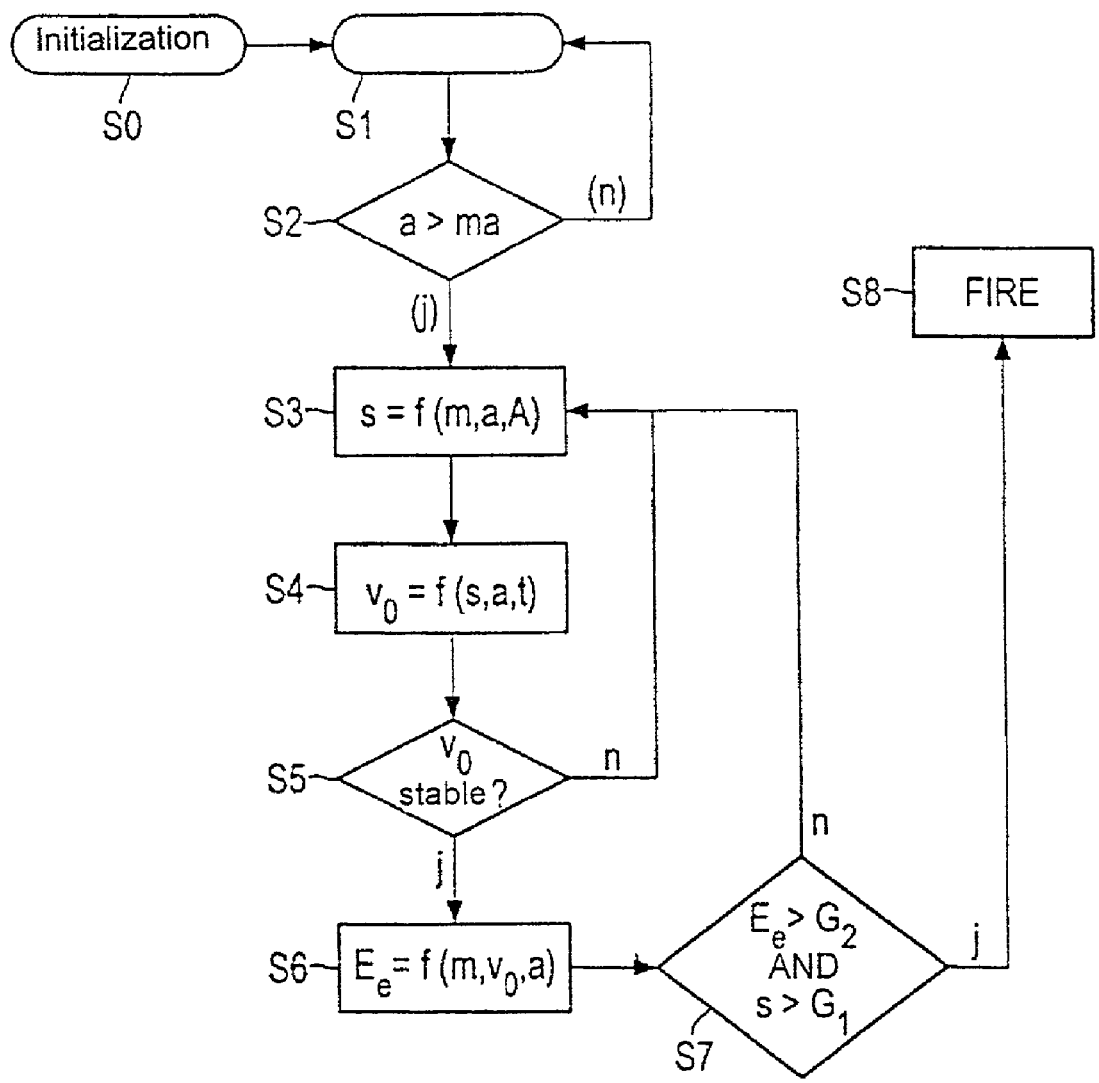

METHOD AND APPARATUS FOR CONTROLLING A VEHICLE OCCUPANT PROTECTION DEVICE

CROSS-REFERENCE TO RELATED APPLICATION

This application is a continuation of copending International Application No. PCT/DE99/02801, filed Sep. 3, 1999, which designated the United States.

BACKGROUND OF THE INVENTION

Field of the Invention

The invention lies in the field of vehicle occupant protection. The invention relates to a method and an apparatus for controlling a vehicle occupant protection device.

European Patent Application 0 156 931 A1 discloses a device having an acceleration sensor, an integrator, a threshold value switch, and a firing element assigned to a vehicle occupant protection device. When the vehicle impacts against an obstacle, the measured acceleration, which, particularly in the case of a head-on impact, usually has a negative sign indicating a deceleration. The integrated acceleration, as a variable for the reduction in velocity, is compared with a threshold value. When the threshold value is exceeded by the integrated acceleration, the firing element is fired.

International PCT Publication WO 90/03040-A discloses a crash sensor embodied as a mechanical deformation sensor that is disposed in the crush zone of the vehicle. The distance between the crash sensor and the fender or impact location is dimensioned such that when the vehicle body is deformed starting from the fender, or the impact location, as far as the location at which the crash sensor is mounted, the crash sensor is also deformed and triggers the vehicle occupant protection.

Configuring the crash sensor in the crush zone of the vehicle entails a considerable expenditure for cabling. Furthermore, the lines from and to the crash sensor are at risk of interruption and short-circuiting due to their exposed routing.

SUMMARY OF THE INVENTION

It is accordingly an object of the invention to provide a method and apparatus for controlling a vehicle occupant protection device that overcomes the hereinafore-mentioned disadvantages of the heretofore-known methods and devices of this general type and that does not use a deformation sensor but nevertheless permits the vehicle occupant protection device to be triggered in good time.

With the foregoing and other objects in view, there is provided, in accordance with the invention, a method for controlling a vehicle occupant protection system, including the steps of providing a mass of a vehicle as an operand, providing a dependence between a deformation of the vehicle body and work to be performed for the deformation, recording the vehicle acceleration, and controlling vehicle occupant protection device as a function of the mass of the vehicle, the work, and the acceleration.

In accordance with another mode of the invention, an actual deformation of the vehicle body is determined as a function of the acceleration, the work, and the mass of the vehicle.

In accordance with a further mode of the invention, the actual deformation of the vehicle body is derived from the equation:

$$A(s) = \int_0^s m \cdot a(s) ds,$$

where m is the mass of the vehicle, a is the acceleration, s the deformation of the vehicle body, and A is the work necessary for the deformation.

In accordance with an added mode of the invention, the vehicle occupant protection device is controlled as a function of one of the actual deformation of the vehicle body and a variable derived from the actual deformation of the vehicle body.

In accordance with an additional mode of the invention, an impact velocity is determined as a function of the acceleration, the work, and the mass of the vehicle.

In accordance with yet another mode of the invention, the vehicle occupant protection device is controlled as a function of one of the determined impact velocity and a variable derived from the impact velocity.

In accordance with yet a further mode of the invention, an actual deformation of the vehicle body is determined as a function of the acceleration, the work, and the mass of the vehicle, and the impact velocity is derived from the actual deformation of the vehicle body.

In accordance with yet an added mode of the invention, the impact velocity is derived from the actual deformation of the vehicle body using the equation:

$$s(t) = v_0 \cdot t + \int_0^t \int_0^t a(t) dt^2$$

where s is the actual deformation of the vehicle body, $v_0$ is the impact velocity, a is the acceleration, and t is time.

In accordance with yet an additional mode of the invention, the impact velocity is calculated at a plurality of times, and one of an averaged impact velocity and a late impact velocity is used, after a transient response, as a basis for further calculations.

In accordance with again another mode of the invention, an expected power drain is determined for the vehicle.

In accordance with again a further mode of the invention, the expected power drain is determined according to the equation:

$$Ee = \frac{m}{2} \cdot \left( v_0 + \int_0^t a(t) dt \right)^2,$$

where, m is the mass of the vehicle, $v_0$ is the impact velocity, a is the acceleration, and t is time.

In accordance with again an added mode of the invention, an enable for the vehicle occupant protection device is supplied if the actual deformation of the vehicle body exceeds a limiting value within a predefined time from a start of an impact.

In accordance with again an additional mode of the invention, an expected power drain is determined for the vehicle, and an enable for the vehicle occupant protection device is supplied if the actual deformation of the vehicle body exceeds a limiting value and simultaneously the expected power drain exceeds a further limiting value.

In accordance with still another mode of the invention, an acceleration (a(t+Δt)) is estimated for a future time.

In accordance with still a further mode of the invention, an estimated forward displacement (x(t+Δt)) of the vehicle occupant for the future time is determined using the estimated acceleration (α(t+Δt)), and an enable for the vehicle occupant protection device is supplied if the future forward displacement (x(t+Δt)) of the vehicle occupant exceeds a threshold value.

In accordance with still an added mode of the invention, the dependence between the deformation of the vehicle body and the work to be performed for the deformation is provided as a function of an impact angle, a future acceleration for each angle-dependent item of work is estimated, the acceleration (a$_\alpha$(t+Δt)) for the future time is estimated based on each impact-angle-dependent work curve made available, and the acceleration recorded at the future time is compared with the estimated accelerations (a$_\alpha$(t+Δt)).

In accordance with still an additional mode of the invention, an impact-angle-dependent work curve forming the basis for the estimated acceleration (a$_\alpha$(t+Δt)) having a smallest deviation from the recorded acceleration is used for further calculations.

In accordance with yet an additional mode of the invention, an impact-angle-dependent work curve forming the basis for the estimated acceleration (a$_\alpha$(t+Δt)) having the smallest deviation from the recorded acceleration defines the impact angle, and the vehicle occupant protection device is controlled as a function of the impact angle determined.

In accordance with still a further mode of the invention, the work to be performed for a deformation of the vehicle body is determined in a crash trial.

In accordance with a concomitant mode of the invention, the work to be performed for a deformation of the vehicle body is determined in a crash trial with a high impact velocity and in a crash trial with a low impact velocity.

With the objects of the invention in view, there is also provided an apparatus for controlling a vehicle occupant protection device of a vehicle including an acceleration sensor for recording a vehicle acceleration, a memory for storing a given mass of a vehicle and a dependence between a deformation of the vehicle body and a work to be performed for the deformation, and an arithmetic unit for controlling the vehicle occupant protection device as a function of the acceleration, the work, and the mass of the vehicle, the arithmetic unit connected to the memory and to the acceleration sensor.

The device has a processor containing at least a memory and an arithmetic unit. Before the vehicle occupant protection device is put into service in the vehicle, the necessary data are usually stored in the memory as a basis for the vehicle body deformation calculations due to impacts. Thus, the memory makes available the mass of the vehicle as an operand, and a dependence between a deformation of the vehicle body and the work to be performed for the deformation. These variables are vehicle-specific variables. If the device according to the invention is provided for operation in different types of vehicle, for example, in a type A and a type B, in the device provided for the type A, the mass of the vehicle of the type A is to be stored in the memory, and, in the device provided for type B, the mass of the vehicle of the type B is to be stored. The same applies to the dependencies between the deformation of the vehicle body and the work to be performed for the deformation.

It is possible to use simply the mass of the vehicle as the variable for the mass of the vehicle, but it is also possible for the simple mass of the vehicle plus an average load (vehicle occupant plus luggage) that characterizes the operation of the vehicle to be stored as a variable in the memory. Of course, the storage of mass-dependent variables such as the weight is also protected.

The dependence between the deformation of the vehicle and the work to be performed for such deformation is determined before the vehicle occupant protection device is put into service, preferably by crash trials. In such trials, an impact obstacle is driven into the vehicle body. The deformation of the vehicle is usually defined here as the distance traveled by the obstacle into the vehicle body starting from the location of the impact. However, it is also possible to define, as the deformation of the vehicle body, a virtual path that depends on the fact that, for example, a defined degree of deformation that has occurred at a location in the crush zone defines the path between the crush zone location and the location of the impact as a deformation of the vehicle body. If, therefore, the obstacle in a crash test is driven head on, i.e., centrally from the front into the vehicle, the force F with which the obstacle penetrates the crush zone of the vehicle can preferably be recorded by way of the penetration depth covered, in other words, the deformation of the vehicle body, which is referred to below with the displacement abbreviation s. Here, the force applied for the deformation of the vehicle body is not at all linear: much less force is required to crush the radiator, for example, than to displace the engine.

If the force profile is determined by a crash test in which the vehicle is driven against an obstacle at a specific impact velocity, the impact velocity should be of such a magnitude that the greatest possible deformation of the vehicle body is achieved, and the largest possible range of values is thus made available for the deformation of the vehicle body. The possibly defective resolution in the force signal here can be increased, for example, by a further impact with a slow impact velocity that supplies a high-resolution force signal in a limited value range of the deformation of the vehicle body. By extrapolating these "low speed" crash test results to the "high speed" crash test results, it is possible to acquire a force profile having a high resolution and that is deformation-dependent over the entire value range of the deformation of the vehicle body.

By integrating the force profile F(s) determined over the deformation s of the vehicle body, the work A(s) necessary for each deformation of the vehicle body is obtained. The associated equation is:

$$A(s) = \int_0^s F(s)ds$$

The dependence between the deformation s of a vehicle body and work A(s) to be performed for it, which is dependent on the type of vehicle, and, in particular, the structure of the vehicle body, is stored as a characteristic curve or as a polynomial in the memory. As such, in some places the work curve instead of the work is also referred to below.

The device also contains an acceleration sensor for recording the acceleration a of the vehicle. The acceleration sensor usually supplies an acceleration-proportional acceleration signal for its sensitivity direction. The acceleration sensor usually has a seismic mass. The measuring principle can be, for example, piezo-resistive, piezo-electric, or capacitive. In order to determine the work/vehicle body deformation curve, the sensitivity axis of acceleration sensor is preferably oriented in the direction that was the direction of the impact for the crash trials carried out in advance. The vehicle occupant protection system preferably serves to trigger the vehicle occupant protection device in the event of a head-on impact. The work curve is then determined by head-on crash trials; the acceleration sensor is then also configured to record head-on crashes and its sensitivity axis is oriented parallel to the longitudinal axis of the vehicle.

In the event of an impact, the vehicle occupant protection device can be activated solely by measuring the acceleration and using the stored data.

All the advantageous developments are essentially described as method steps. The arithmetic unit of the device according to the invention is configured to carry out the method steps. Thus, the developments are associated with the device.

At any point in time, the deformation of the vehicle body is preferably determined in the vehicle starting from the location of the impact, that is to say, in particular, starting from the fender in the case of a head-on impact.

Because the force F for penetration into the vehicle body is equivalent to the acceleration a necessary for it multiplied by the mass m of the vehicle, the following equation (1) is obtained:

$$A(s) = \int_0^s m \cdot a(s) ds \qquad (1)$$

With the measured acceleration a, the stored mass m of the vehicle, and the stored work curve A(s) for various deformations s of the vehicle body, it is possible to solve the differential equation using prior art solution systems for differential equations at any point in time during an accident after the deformation s of the vehicle body that has actually occurred.

Of course, embodiments of the invention in which the mass and the work curve are not explicitly stored in the memory but instead, for example, a work curve relating to the mass m, or an acceleration polynomial, are also covered by the protection; both of the variables resulting from mathematical conversions of the equations above and, as a result, provide for storage variables other than the mass and the work curve.

The vehicle occupant protection device, for example, an airbag or a seatbelt pretensioner, is now controlled, and, if appropriate, also triggered, as a function of the actual deformation of the vehicle body or a variable derived from the actual deformation.

With the device and the method according to the invention, it is possible to determine the penetration depth of the obstacle at any point in time without making available a position sensor, configured as a crash sensor, in the crush zone, and only using an acceleration sensor. The vehicle body deformation constitutes a significant variable for the triggering of the vehicle occupant protection device because it can be used to deduce directly that the penetrating object endangers the vehicle occupant. Such a result is, in particular, extraordinary because it is not possible to draw conclusions about the deformation of the vehicle body alone neither from the recorded acceleration nor by doubled integration of the acceleration due to the fact that the deformation of the vehicle body is mathematically derived from the equation:

$$s(t) = s_0 + v_0 \cdot t + \int_0^t \int_0^t a(t) dt^2.$$

Indeed, $s_0$ is equal to zero because usually there is no preliminary deformation. The acceleration a is measured. However, the impact velocity $v_0$ with which the vehicle strikes the obstacle is not known. Thus, the deformation of the vehicle body can be determined according to the invention only from the measured acceleration and the stored variables. The same applies to the way of determining the impact velocity $v_0$ as described below.

In one advantageous development of the invention, the impact velocity $v_0$ is derived from the actual deformation s of the vehicle body. The impact velocity $v_0$ is, in contrast to the velocity reduction that is known from the prior art and derived from the acceleration signal by integration, a variable that stands directly for the impact energy transmitted to the vehicle. The impact velocity cannot be derived solely from a measured acceleration by using a speedometer of the vehicle because the speedometer merely supplies the absolute velocity of the vehicle. The speedometer does not supply the impact velocity $v_0$ that is made up additively as a function of direction from the absolute velocity of the vehicle and the velocity of the impact obstacle.

The impact velocity $v_0$ is derived from the actual deformation s of the vehicle body using the equation (2):

$$s(t) = v_0 \cdot t + \int_0^t \int_0^t a(t) dt^2, \qquad (2)$$

where s is the actual deformation of the vehicle body, $v_0$ is the impact velocity, a is the acceleration, and t the time.

In a further advantageous development of the invention, the impact velocity $v_0$ can also be acquired in another way. To acquire the velocity $v_0$, the equation (2) that supplies the deformation s of the vehicle body is used in equation (1). Equation (1) is subsequently resolved in accordance with the impact velocity $v_0$. The resolution of the non-linear equation (1) can then be carried out by iterative steps. An imaginary impact velocity $v_0$ is initially selected and inserted into the equation (1). The imaginary impact velocity $v_0$ is modified as a function of the deviation on the work curve when the equation (1) is solved with the imaginary impact velocity $v_0$. Thus, the real impact velocity $v_0$ can be acquired in a plurality of iterative calculation steps. The impact velocity $v_0$ is, thus, subject to a transient response due to computing technology. An averaged impact velocity or a late impact velocity after a transient response is, therefore, preferably used as a basis for further calculations.

Different advantageous solutions are suitable for triggering the vehicle occupant protection device as set forth below.

Firstly, the vehicle occupant protection device can be triggered if the deformation of the vehicle body exceeds a limiting value. However, penetration of the obstacle to a limiting value can take place here due to a slow impact at a relatively late time from the start of impact that is usually characterized by a minimum acceleration value being exceeded. As a result, the vehicle occupant, in the meantime displaced a long way forward, could be injured rather than protected as a result of the vehicle occupant protection device being triggered. The vehicle occupant protection device is, therefore, advantageously triggered only if the limiting value of the deformation of the vehicle body is reached or exceeded within a predefined time from the start of impact. In the triggering decision, the impact energy is, therefore, reflected in the speed of the deformation of the vehicle body. In the case of an impact with a high velocity, triggering occurs at an early time because the limiting value of the deformation of the vehicle body is reached quickly. In the case of a slow impact, possibly with low force acting for a long period, the limiting value of the deformation of the vehicle body is reached at a point in time that is too late for the vehicle occupant protection device to be triggered.

In one advantageous development, the vehicle occupant protection device is triggered if the impact velocity $v_0$ that is determined exceeds a predefined limiting value.

In a further advantageous development of the invention, a further expected power drain $E_e$ for the vehicle is firstly determined in accordance with the equation:

$$E_e = \frac{m \cdot v_0^2}{2} - F(s)$$

or $$E_e = \frac{m}{2}\left(v_0 + \int_0^t a(t)dt\right)^2$$

The meaning of the variables is given above.

Preferably, an enable is then supplied for the vehicle occupant protection device if the actual deformation s of the vehicle body exceeds a limiting value and, at the same time, the expected power drain exceeds a further limiting value. Qualitatively, the triggering approach is equivalent to the previous triggering approach with the deformation of the vehicle body with a time limiting value, because, with respect to the impact, when there is a large degree of deformation of the vehicle body and a high level of energy to be absorbed, the impact must be severe. However, if only a small amount of energy to be absorbed is expected when the limiting value of the vehicle body is exceeded, the impact must be a slow one and a considerable amount of time must already have passed since the start of the impact. Then, triggering is not supported.

In a further advantageous development of the invention, an estimate of the acceleration $a(t+\Delta t)$ is performed for a future time $t+\Delta t$. The estimate is carried out here according to the equation (2):

Equation (3):

$$s(t + \Delta t) = s(t) + \frac{ds}{dt}\Delta t = v_o \cdot (t + \Delta t) + \int_0^t \int_0^t a(t + \Delta t)dt^2.$$

The differential change $$\frac{ds}{dt}\Delta t$$

of the deformation of the vehicle body in the future time period $\Delta t$ can be estimated from the previous profile of the deformation of the vehicle body, for example, by extrapolation—for example, linearly by the formation of tangents. Thus, Equation (3) can be solved according to the estimated, future acceleration $a(t+\Delta t)$.

The determination of an estimated velocity $v(t+\Delta t)$, which results from integration over time of the estimated acceleration $a(t+\Delta t)$, is equivalent to the estimated acceleration $a(t+\Delta t)$ and is also placed under protection. The use of the estimated velocity $v(t+\Delta t)$ instead of the estimated acceleration $a(t+\Delta t)$ is advantageous to the extent that a filtering effect of the estimated acceleration $a(t+\Delta t)$ occurs.

The estimated acceleration $a(t+\Delta t)$ or the estimated velocity $v(t+\Delta t)$ can be used advantageously here in various ways.

First, an estimated forward displacement $x(t+\Delta t)$ of the vehicle occupant can be determined for the future time $t+\Delta t$ using the estimated acceleration $a(t+\Delta t)$. The estimated forward displacement of a vehicle occupant is determined in accordance with the equation:

$$x(t + \Delta t) = \int_0^t \int_0^t a(t + \Delta t)dt^2.$$

Triggering of the vehicle occupant protection device can preferably also be initiated if, due to an impact, a minimum forward displacement of a vehicle occupant derived from the acceleration is exceeded. The problem with the triggering of an airbag based on the forward displacement calculated in this way is that a triggering command has to be output at an early time because inflation of a front airbag to its full volume takes approximately 30 ms. Therefore, at the time of triggering, the forward displacement of the vehicle occupant must be estimated for a time 30 ms in the future and the estimated forward displacement must be used to evaluate whether or not triggering is at all necessary. By using the estimated acceleration $a(t+\Delta t)$ determined, it is also advantageously possible to estimate the forward displacement $x(t+\Delta t)$ of the vehicle occupant with $\Delta t$ of approximately 30 ms and, thus, bring about, as sole criterion or together with other criteria for the vehicle occupant protection device, an enable when an associated limiting value is exceeded.

On the other hand, the acceleration $a(t+\Delta t)$ that is estimated for a future time can advantageously be used to make the triggering decision more precise or to determine the impact angle.

In both cases, work curves that are dependent on the deformation of the vehicle body are stored in the memory not only for a single impact angle but also for different impact angles, for example, for a head-on impact with 0 degrees for the longitudinal axis of the vehicle and for, in each case, an oblique impact with +/−30 degrees with respect to the longitudinal axis of the vehicle. Because the structure of the vehicle body is constructed differently in different directions, the expenditure of work to achieve a deformation of the vehicle body differs as a function of the direction. The work curves or polynomials are, as described above, determined empirically, but now as a function of the direction of impact. Consequently, a plurality of work curves $A_\alpha(s)$ are stored as a function of the impact angle $\alpha$.

Because the impact angle $\alpha$ is not known in a real accident, to give more details on the triggering method it is necessary, when calculating the deformation s of the vehicle body, to select, among the angle-dependent work curves $A_\alpha(s)$, that work curve $A(s)$ whose basic impact angle $\alpha$ deviates least from the true impact angle $\alpha$. Here, the acceleration $a(t+\Delta t)$ at a future time is estimated by each angle-dependent work curve $A_\alpha(s)$. As a result, a number of angle-dependent, estimated accelerations $a_\alpha(t+\Delta t)$ are obtained for a future time. When the future time $t+\Delta t$ is actually reached, the estimated accelerations $a_\alpha(t+\Delta t)$ are compared with the real acceleration a recorded by the acceleration sensor.

In what follows, the impact-angle-dependent work curve $A_\alpha(s)$ that forms the basis for the estimated acceleration $a_\alpha(t+\Delta t)$ having the least deviation from the recorded acceleration a can be used for further calculations.

Second, the impact-angle-dependent work curve $A_\alpha(s)$ that is determined can approximately predefine the impact angle $\alpha$. The latter can be used for direction-dependent selection of one of a plurality of vehicle occupant protection devices.

The vehicle occupant protection device is preferably directly triggered when the abovementioned conditions are met. However, in a further advantageous development, the process by which the limiting values are exceeded by associated variables is used to implement a Safing function that supplies an enable signal when the limiting values are exceeded: in such a context, an impact is additionally evaluated with other devices, for example, with a further acceleration sensor, with a crash sensor, or else also with a further evaluator or with a further triggering algorithm. These further devices supply a triggering signal. The triggering signal is AND-linked to the enable signal supplied by the device according to the invention. The vehicle occupant protection device is triggered only if both signals are present. The parameters of the device according to the invention are generally dimensioned, for example, the limiting values set low, such that the enable signal provides a time window in which the triggering signal can be placed at the best possible time.

Other features that are considered as characteristic for the invention are set forth in the appended claims.

Although the invention is illustrated and described herein as embodied in a method and apparatus for controlling a vehicle occupant protection device, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a block circuit diagram of the device according to the invention;

FIG. 2 is a flow chart of the method according to the invention;

DESCRIPTION OF THE PREFERRED EMBODIMENTS

Figure 3:
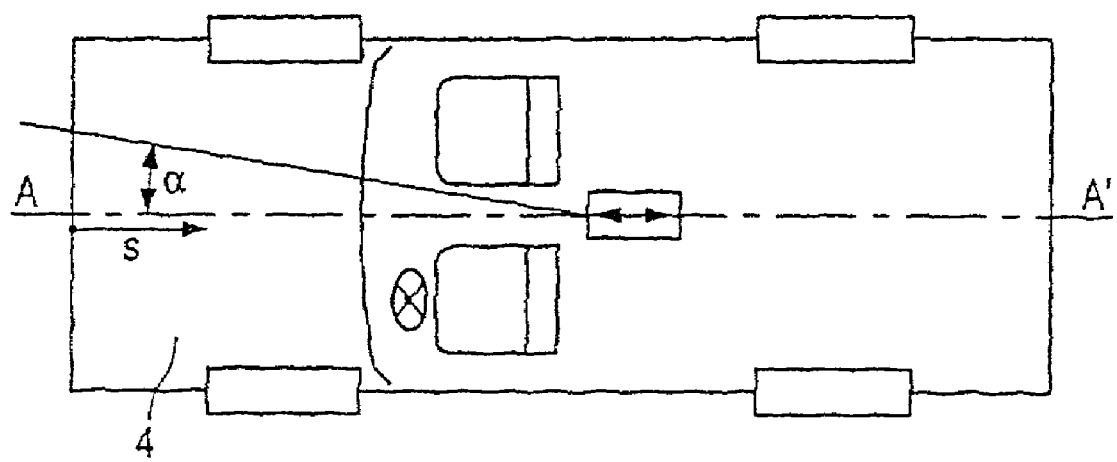
FIG. 3 is a top-plan view of a vehicle having the device according to the invention.

In all the figures of the drawing, sub-features and integral parts that correspond to one another bear the same reference symbol in each case.

Referring now to the figures of the drawings in detail and first, particularly to FIG. 1 thereof, there is shown a block circuit diagram of the device according to the invention with an acceleration sensor 1, a processor 2 with an arithmetic unit 21, and a memory 22, preferably a non-volatile memory such as an EEPROM. Also shown are two vehicle occupant protection devices 3 connected to the processor 2.

The acceleration sensor 1 supplies the recorded acceleration a to the processor 2 for evaluation. The arithmetic unit 21 determines, in the manner described above, whether or not it is necessary to trigger one or more of the vehicle occupant protection devices 3. The triggering is carried out by an enable signal f.

Figure 4:
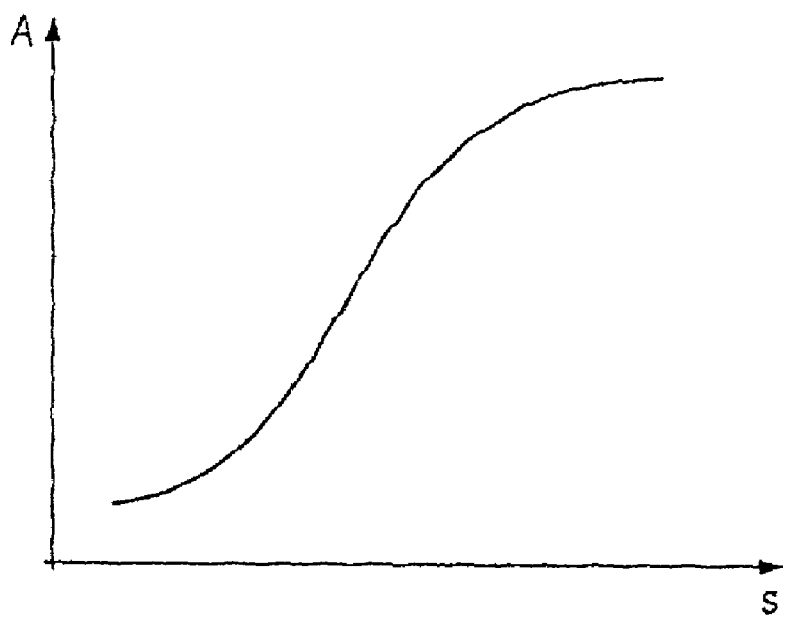
FIG. 4 is a plot of a curve upon which the method of the invention is based.

The arithmetic unit 21 uses variables stored in the memory 21 to carry out the method according to the invention. The variables include the mass m of the vehicle and the function work A as a function of the deformation s of the vehicle body performed by the work A in the vehicle body in a predefined direction. The deformation s is, like the mass m of the vehicle, specific to a motor vehicle. An exemplary work curve A(s) is shown in FIG. 4.

If appropriate, a plurality of work curves for deformations $A_\alpha(s)$ of vehicle bodies are stored in the memory as a function of angles, which deformations $A_\alpha(s)$ of a vehicle body can be used by the arithmetic unit 21 in the manner described above.

In FIG. 3, a motor vehicle with a longitudinal axis A-A' and an exemplary angle α with respect to the longitudinal axis A-A' are shown. An exemplary deformation s of the vehicle body is also shown. The deformation s of the vehicle body starts from an imaginary fender of the vehicle and extends along the longitudinal axis A-A' in the crush zone 4 of the vehicle.

The acceleration sensor 1 and the associated processor are disposed approximately in the center of the vehicle in a common control unit.

FIG. 2 shows a flow chart of the method according to the invention. In step S0, the vehicle occupant protection system is initialized and goes into the state S1 in which step S2 permanently checks whether or not the acceleration a has exceeded a minimum value ma. Upon exceeding the minimum value ma, the impact calculations (j) are started. If the minimum acceleration ma is detected (j), in step S2 the deformation s of the vehicle body is calculated as a function of the mass m of the vehicle, the recorded acceleration a, and the stored work curve A(s) in accordance with the measures above. In step S4, the impact velocity $v_0$ is calculated as function f of the calculated deformation s of the vehicle body, the acceleration a, and the time t, likewise in accordance with the equations above. If the impact velocity $v_0$ that is determined proves stable after a plurality of calculation cycles (step S5), in step S6 the further expected reduction in energy $E_e$ is determined as function f of, for example, the mass m of the vehicle, the impact velocity $v_0$, and the acceleration a. If the impact velocity is still not stable (n) in step S5, a renewed calculation cycle is necessary in steps S3 and S4.

The triggering criterion for the vehicle occupant protection device is checked in step S7. If the deformation s of the vehicle body and the expected energy $E_e$ exceed associated limiting values G1 and G2(j), the vehicle occupant protection device is triggered in step S8. If at least one of the limiting values G1 or G2 is not exceeded by the associated signal (n), the deformation s of the vehicle body is calculated again at a further time.

The limiting values G1 and/or G2 may be constant or variable.

I claim:

1. A method for controlling a vehicle occupant protection system, which comprises:
   providing a value of a mass of a vehicle as an operand from a memory;
   providing, from the memory, information indicating a dependence between a deformation of a vehicle body and work to be performed for the deformation;
   sensing a vehicle acceleration with an acceleration sensor; and
   controlling a vehicle occupant protection device as a function of the mass of the vehicle, the work, and the acceleration.

2. The method according to claim 1, which further comprises determining an actual deformation of the vehicle body as a function of the acceleration, the work, and the mass of the vehicle.

3. The method according to claim 2, which further comprises deriving the actual deformation of the vehicle body from the equation:

$$A(s) = \int_0^s m \cdot a(s) ds,$$

where m is the mass of the vehicle, a is the acceleration, s the deformation of the vehicle body, and A is the work necessary for the deformation.

4. The method according to claim 2, which further comprises controlling the vehicle occupant protection device as a function of one of the actual deformation of the vehicle body and a variable derived from the actual deformation of the vehicle body.

5. The method according to claim 1, which further comprises determining an impact velocity as a function of the acceleration, the work, and the mass of the vehicle.

6. The method according to claim 5, which further comprises controlling the vehicle occupant protection device as a function of one of the determined impact velocity and a variable derived from the impact velocity.

7. The method according to claim 5, which further comprises:
determining an actual deformation of the vehicle body as a function of the acceleration, the work, and the mass of the vehicle; and
deriving the impact velocity from the actual deformation of the vehicle body.

8. The method according to claim 7, which further comprises deriving the impact velocity from the actual deformation of the vehicle body using the equation:

$$s(t) = v_0 \cdot t + \int_0^t \int_0^t a(t) dt^2$$

where s is the actual deformation of the vehicle body, $v_0$ is the impact velocity, a is the acceleration, and t is time.

9. The method according to claim 5, which further comprises:
calculating the impact velocity at a plurality of times; and
using, after a transient response, one of an averaged impact velocity and a late impact velocity as a basis for further calculations.

10. The method according to claim 1, which further comprises determining an expected power drain for the vehicle.

11. The method according to claim 10, which further comprises performing the determining step by determining the expected power drain according to the equation:

$$Ee = \frac{m}{2} \cdot \left( v_0 + \int_0^t a(t) dt \right)^2,$$

where, m is the mass of the vehicle, $v_0$ is the impact velocity, a is the acceleration, and t is time.

12. The method according to claim 4, which further comprises supplying an enable for the vehicle occupant protection device if the actual deformation of the vehicle body exceeds a limiting value within a predefined time from a start of an impact.

13. The method according to claim 4, which further comprises:
determining an expected power drain for the vehicle; and
supplying an enable for the vehicle occupant protection device if the actual deformation of the vehicle body exceeds a limiting value and simultaneously the expected power drain exceeds a further limiting value.

14. The method according to claim 1, which further comprises estimating an acceleration ($a(t+\Delta t)$) for a future time.

15. The method according to claim 14, which further comprises:
determining an estimated forward displacement ($x(t+\Delta t)$) of the vehicle occupant for the future time using the estimated acceleration ($\alpha(t+\Delta t)$); and
supplying an enable for the vehicle occupant protection device if the future forward displacement ($x(t+\Delta t)$) of the vehicle occupant exceeds a threshold value.

16. The method according to claim 15, which further comprises:
providing the dependence between the deformation of the vehicle body and the work to be performed for the deformation as a function of an impact angle;
estimating a future acceleration for each angle-dependent item of work;
estimating the acceleration ($a_{60}(t+\Delta t)$) for the future time based on each impact-angle-dependent work curve made available; and
comparing the acceleration recorded at the future time with the estimated accelerations ($a_\alpha(t+\Delta t)$).

17. The method according to claim 16, which further comprises using an impact-angle-dependent work curve forming the basis for the estimated acceleration ($a_\alpha(t+\Delta t)$) having a smallest deviation from the recorded acceleration for further calculations.

18. The method according to claim 16, wherein an impact-angle-dependent work curve forming the basis for the estimated acceleration ($a_\alpha(t+\Delta t)$) having the smallest deviation from the recorded acceleration defines the impact angle, and which further comprises controlling the vehicle occupant protection device as a function of the impact angle determined.

19. The method according to claim 1, which further comprises determining the work to be performed for a deformation of the vehicle body in a crash trial.

20. The method according to claim 19, which further comprises performing the determining step by determining the work to be performed for a deformation of the vehicle body in a crash trial with a high impact velocity and in a crash trial with a low impact velocity.

21. An apparatus for controlling a vehicle occupant protection device of a vehicle having a given mass and a body, comprising:
an acceleration sensing system for recording a vehicle acceleration;
a memory for storing a value of the mass of the vehicle and information indicating a dependence between a deformation of the vehicle body and a work to be performed for the deformation; and
an arithmetic unit for controlling the vehicle occupant protection device as a function of the acceleration, the work, and the mass of the vehicle, said arithmetic unit connected to said memory and to said acceleration sensing system.

* * * * *